Sept. 5, 1967 W. B. LAUDER ETAL 3,340,007
PRODUCTION OF ULTRA-FINE FERRIC OXIDE BY REACTING
FERRIC CHLORIDE WITH NITROGEN DIOXIDE
Filed Nov. 21, 1963
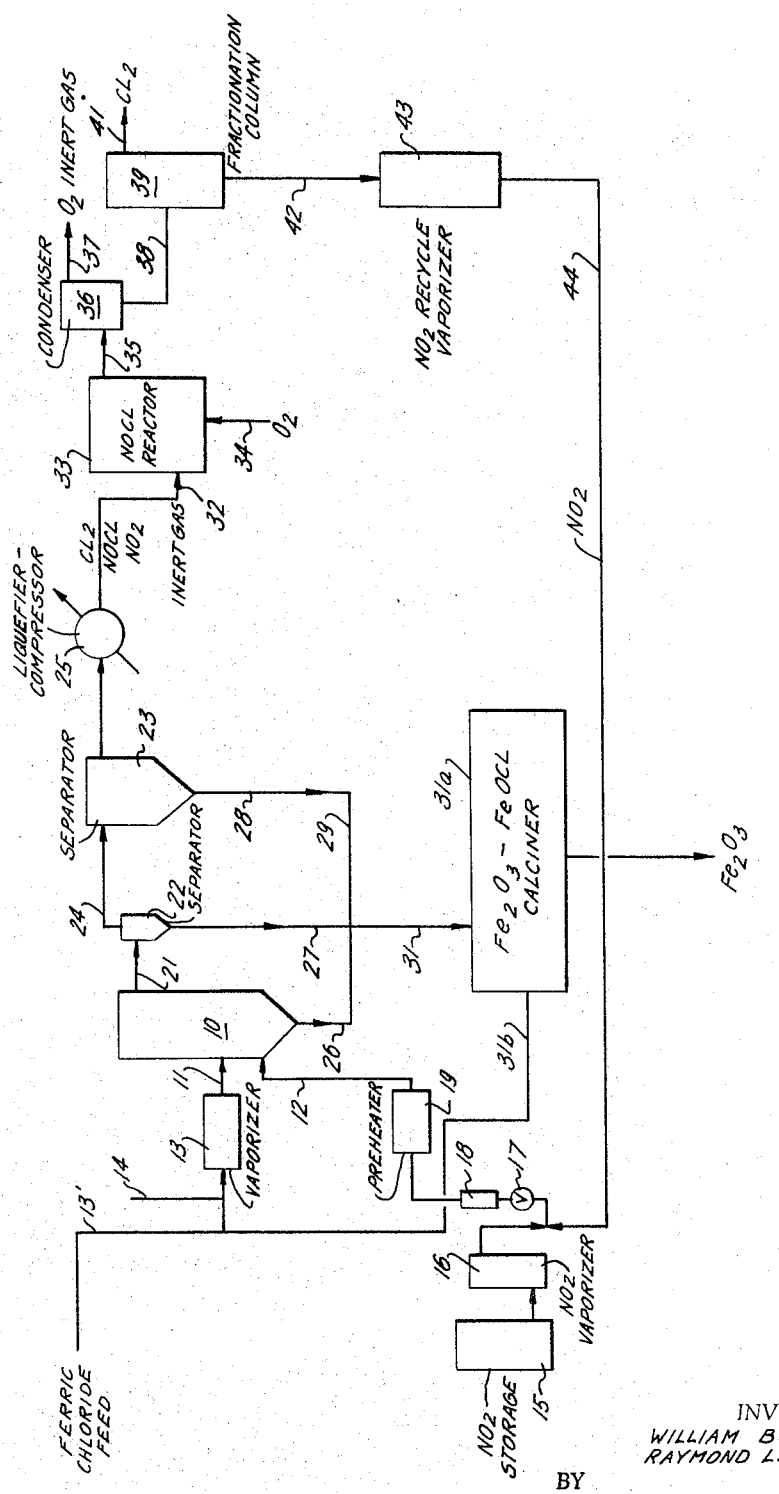
INVENTORS
WILLIAM B. LAUDER
RAYMOND L. COPSON
BY
Benjamin Sweedler
ATTORNEY

United States Patent Office 3,340,007
Patented Sept. 5, 1967

3,340,007
PRODUCTION OF ULTRA-FINE FERRIC OXIDE BY REACTING FERRIC CHLORIDE WITH NITROGEN DIOXIDE
William B. Lauder and Raymond L. Copson, Syracuse, N.Y., assignors to Allied Chemical Corporation, New York, N.Y., a corporation of New York
Filed Nov. 21, 1963, Ser. No. 325,414
The portion of the term of the patent subsequent to Aug. 2, 1983, has been disclaimed
4 Claims. (Cl. 23—200)

This invention relates to the production of iron oxide ($Fe_2O_3$) and, more particularly, to the production of a novel form of iron oxide having desirable properties rendering it eminently satisfactory for use in producing ferrites, pigments and for other uses. This invention includes the process of producing such iron oxides as well as the resultant novel iron oxide product.

Iron oxide is usually produced by oxidizing iron disulfide, igniting ferric hydroxide or igniting ferrous sulfate. As heretofore produced iron oxide left considerable to be desired from the standpoint of its reactivity, particularly in solid state reactions as, for example, in the formation of ferrites.

It is a principal object of the present invention to provide a relatively low temperature process for producing iron oxide having a unique combination of desirable properties, namely, ultra-fine particle size, low bulk density, high surface area and high reactivity as compared with heretofore known iron oxides.

It is another object of this invention to provide a novel iron oxide of micron or sub-micron particle size, of low bulk density, high surface area and exceptionally high reactivity.

Other objects and advantages of this invention will be apparent from the following detailed description thereof.

All percentages and parts in the specification are given on a weight basis.

In accordance with this invention anhydrous ferric chloride in the vapor phase is reacted with nitrogen dioxide at temperatures of from about 285° to 420° C. employing at least about the stoichiometric amount of nitrogen dioxide to convert the ferric chloride to iron oxide. Preferably an excess of from 20% to 40% nitrogen dioxide over and above this stoichiometric amount is used. Under these reaction conditions a mixture of iron oxide and iron oxychloride results; in general, the reaction product contains from 5% to 20% chlorine, from 68% to 60% iron, and the rest oxygen. It is a mixture of amorphous and crystalline iron oxides ($Fe_2O_3$) and oxychlorides in the solid phase and of ultra-fine particle size, the particles seldom exceeding 2 microns in size and having an average particle size of about 0.5 micron.

The solid reaction product thus obtained upon heating to a temperature of at least about 900° C., preferably from 900° to 1100° C., the higher the temperature the shorter the heating time, is converted to chemically pure iron oxide ($Fe_2O_3$) of unusually low bulk density, ultra-fine particle size, high surface area and exceptionally high reactivity. This product is therefore eminently satisfactory for use as pigments and in the production of ferrites. For example, it can be reacted with oxides of magnesium and manganese with or without other additives, such as calcium fluoride, copper oxide, nickel oxide, etc., to produce cores and other ceramic bodies useful in the electronic field, for example, in the production of inductance coils, transformers and magnetic cores in general.

The ferric chloride used can be produced in any desired manner, for example, by chlorinating red hot iron, oxidizing ferrous chloride, or by other methods; the ferric chloride of commerce can be used. If the ferric chloride contains impurities such as would contaminate the iron oxide product, the ferric chloride is purified by vaporization and fractional condensation of the vapors to obtain a relatively pure ferric chloride. The ferric chloride introduced into the reactor should be anhydrous; desirably it is produced by heating ferric chloride to a temperature above its vaporization temperature under the pressure conditions at which the vaporization is effected. When conducted as preferred under atmospheric pressure conditions, the ferric chloride is heated to a temperature of at least 315° C. Operating under vacuum conditions the temperature can be lower, depending upon the vacuum used.

The nitrogen dioxide introduced into the reactor can be $NO_2$, or $N_2O_4$, or mixtures of $NO_2$ and $N_2O_4$; actually the nitrogen dioxide employed in the reaction is the equilibrium mixture of $NO_2$, $N_2O_4$, NO, and $O_2$ prevailing at the reaction temperature. Desirably, the nitrogen dioxide is preheated to reaction temperature before introduction into the reactor. The reaction product thus produced of ultra-fine particle size contains appreciable amounts of chloride and some free chlorine.

A typical analysis of this reaction product showed 16.1% total chlorine, 22.7% oxygen, and 61.2% iron.

Produced with the solid iron oxide-iron oxychlorides in the reactor are gaseous reaction products consisting of nitrosyl chloride and chlorine. The solid iron oxide-oxychloride mixture is separated from these gaseous reaction products. The latter can be treated in known manner to oxidize the nitrosyl chloride to produce nitrogen dioxide and chlorine. The chlorine thus produced and that formed in the reaction with the ferric chloride is recovered as a valuable by-product. The nitrogen dioxide can be recycled to the oxidizer for reaction with the ferric chloride.

The ultra-fine solid reaction product thus produced can be used as such where the chloride content is not objectionable. For example, it can be reacted with other metal oxides and metal compounds to produce ferrites, thus effecting the removal of the chloride content simultaneously with the solid state reaction to produce the ferrites. Alternatively, this reaction product can be heated to a temperature of about 900° C. or higher to decompose the oxychloride completely and to evolve the iron chloride formed in the decomposition, and produce chemically pure iron oxide in ultra-fine particle size of low bulk density, high surface area, and unusually high reactivity. A typical product had a bulk density, in the loose condition, i.e., not subjected to tapping to cause the particle to settle, of 0.377 gram per cc. and a bulk density tapped of 0.796 gram per cc. 99% by weight of these particles had a particle size between 0.05 and 2 microns. The average particle size of the particles was 0.5 micron, equivalent to a surface area of 2.34 square meters per gram.

The accompanying drawing is a flow sheet showing diagrammatically one arrangement of equipment for practicing a preferred embodiment of the invention.

Referring to the drawing, the oxidizer reactor 10 is supplied with anhydrous ferric chloride vapor and nitrogen dioxide through lines 11 and 12, respectively. Ferric chloride is introduced into the vaporizer 13 through feed line 13′. An inert carrier gas, preferably nitrogen, can be introduced into the vaporizer 13 through line 14, and the resultant mixture of carrier gas and anhydrous ferric chloride vapors flow through line 11 into the oxidizer reactor 10. Liquid nitrogen dioxide is supplied from the storage tank 15 to a vaporizer 16 from which the vapors flow through a control valve 17, a flow indicator 18 and thence to the nitrogen dioxide preheater 19 communicating with line 12 leading into reactor 10.

Gaseous reaction products containing entrained reaction product leave the top of reactor 10 through line 21 and enter the cyclone separator 22 where initial separation of reaction product from the gases takes place. From the cyclone separator 22, the gas stream containing residual entrained reaction product flows to the bag separator 23 through line 24. From this bag separator 23, gases consisting chiefly of nitrosyl chloride, chlorine, nitrogen dioxide and inert carrier gas enter the liquefier-compressor 25.

Reaction product is withdrawn from the base of the reactor line 10 through line 26, from the cyclone separator 22 through line 27 and from the bag separator 23 through line 28. These lines lead into manifold 29 provided with a discharge conduit 31 through which the reaction product is discharged into a calciner 31a where the ferric oxide-oxychloride mixture is heated to a temperature of at least about 900° C., preferably from 900° to 1100° C., to convert the oxychloride to ferric oxide. The ferric chloride produced upon decomposition of the oxychloride is passed through line 31b into the ferric chloride feed line 13′.

Liquefier-compressor 25 effects liquefaction of the nitrosyl chloride, chlorine and nitrogen dioxide in the gaseous stream passing therethrough. The resultant mixture of liquid and inert gas flows through line 32 into the nitrosyl chloride reactor 33, which may be of the type disclosed in United States Patent 2,297,281, having an oxygen inlet 34 and communicating through line 35 with a condenser or cooler 36. In reactor 33 the nitrosyl chloride is oxidized under a pressure of from 150 to 1500 p.s.i.g. and at a temperature of from 50° to 100° C., as disclosed in United States Patent 2,297,281, to produce nitrogen dioxide and chlorine. The reaction products from reactor 33 enter the condenser 36 through line 35 where separation takes place of the oxygen and the inert gas, removed through line 37, from the liquid mixture of chlorine and nitrogen dioxide which flows through line 38 into the fractionating column 39. Here fractionation of this liquid mxiture takes place; the chlorine is removed overhead through line 41. The nitrogen dioxide is removed through line 42 and enters the vaporizer 43 where vaporization is effected. The vapors flow through line 44 for recycle through the process.

Reactor 10 may be lined with or built from acid brick, ceramic material, glass, stoneware or glazed steel, provided with a cooler, such as a jacket through which a suitable cooling medium is passed, to maintain the reactor walls at a maximum temperature of 500° C., preferably 430° C. Other materials of construction resistant to corrosion under the prevailing conditions may, of course, be used. The filter bag in the bag separator 23 desirably is of polyester material, e.g., Dacron, or other filter medium not attacked by the reaction products.

The ferric chloride vapor, inert carrier gas mixture leaves the vaporizer 13 and enters the oxidizer 10 at a temperature of from 175° to 500° C., preferably 285° to 420° C. The nitrogen dioxide is preheated in preheater 19 to a temperature approximately the same as the inlet temperature of the ferric chloride. The temperature in the reactor 10 is maintained within the range of from 285° to 420° C. The reactor 10 desirably is jacketed for circulation therethrough of a suitable cooling medium to maintain the desired reaction temperature; the reaction is exothermic and once started requires cooling to maintain the reaction temperature at the desired level.

The following example is given to illustrate a preferred embodiment of this invention with the understanding that the invention is not limited to this example. In the example the temperatures are gven in degrees centigrade. All percentages and parts are given on a weight basis.

*Example*

73.7 parts of anhydrous ferric chloride was vaporized from an electrically heated pot and conveyed by a stream of nitrogen preheated to a temperature of 330° into a vertical reactor similar to reactor 10 shown in the drawing which was maintained at 330°; the 73.7 parts of anhydrous ferric chloride vapor was introduced into the reactor over a period of 1⅓ hours. 40 parts of nitrogen dioxide gas also preheated to 330° was introduced during this 1⅓ hour period. The nitrogen dioxide reacted with the ferric chloride to form an oxidation product which was collected and separated from the gaseous reaction products. 29 parts of crude product was thus obtained. Analysis of this product showed that it had a chlorine content of 16.1%; this compared with 65.6% chlorine in the anhydrous ferric chloride. The product after heating to 600° analyzed 4.38% chlorine, 67.1% iron and the rest combined oxygen.

In a second run, under substantially the same conditions, the product produced at 330° analyzed 16.3% chlorine, and upon heating to 600° 1.87% chlorine and 68.4% iron. This compares with 69.9% iron for pure $Fe_2O_3$.

X-ray diffraction patterns of the product obtained from the reactor showed it to be partially amorphous and partially crystalline FeOCl and also partially amorphous and partially crystalline $Fe_2O_3$.

Upon heating the product to 900° for one hour, a pigment grade of iron oxide was formed having a tinting strength at least as good as commercially available iron oxide pigments.

The product produced by heating to 900° contained about 70% alpha or crystalline $Fe_2O$ and 30% amorphous $Fe_2O_3$. Its bulk density, loose, is 0.377 g./cc. and tapped is 0.796 g./cc. On a weight basis 99% of the particles have a particle size of between 0.05 and 2 microns. The average particle size is 0.5 micron.

It will be noted that the present invention provides a process for producing iron oxide of high reactivity, low bulk density, and ultra-fine particle size.

Since certain changes in carrying out the process above described can be made without departing from the scope of this invention, it is intended that all matter contained in the above description or shown in the accompanying drawing shall be interpreted as illustrative and not in a limiting sense.

What is claimed is:

1. The process which comprises reacting anhydrous ferric chloride in the vapor phase with nitrogen dioxide at a temperature of from 285° to 420° C. to produce a ferric oxide-ferric oxychloride reaction product in the solid phase, and recovering the solid reaction product.

2. The process as defined in claim 1, including the further step of heating the reaction product of a temperature of at least about 900° C. to produce iron oxide.

3. An iron oxide product produced by the process of claim 2, said iron oxide product being comprised of a mixture of alpha and amorphous iron oxide, having a particle size between about 0.05 and 2 microns.

4. The process of producing iron oxide which comprises reacting ferric chloride in the vapor phase under anhydrous conditions with nitrogen dioxide at a temperature within the range of from 285° to 420° C. in at least about the stoichiometric proportions for the reaction between the ferric chloride and nitrogen dioxide to form iron oxide, separating the solid reaction product consisting essentially of a mixture of iron oxide and iron oxychloride from the gaseous reaction product, and heating the separated solid reaction product to a temperature of at least 900° C. to produce iron oxide.

References Cited

UNITED STATES PATENTS 2,635,946  4/1953  Weber et al. _____ 23—200 X
2,823,982  2/1958  Saladin et al. _____ 23—142 X OSCAR R. VERTIZ, *Primary Examiner.*

J. J. BROWN, G. T. OZAKI, *Assistant Examiners.*